(12) United States Patent
Kopinsky

(10) Patent No.: US 7,600,506 B2
(45) Date of Patent: Oct. 13, 2009

(54) FUEL TANK HAVING IMPROVED THERMAL STABILITY

(75) Inventor: Joel Kopinsky, Farmington Hills, MI (US)

(73) Assignee: ITB Group Ltd, Novi, MI (US)

( * ) Notice: Subject to any disclaimer, the term of this patent is extended or adjusted under 35 U.S.C. 154(b) by 44 days.

(21) Appl. No.: 12/046,563

(22) Filed: Mar. 12, 2008

(65) Prior Publication Data

US 2009/0229580 A1  Sep. 17, 2009

(51) Int. Cl.
*F02M 37/20* (2006.01)
(52) U.S. Cl. .................. 123/516; 220/562
(58) Field of Classification Search ............ 123/516; 220/4.13, 4.14, 562
See application file for complete search history.

(56) References Cited

U.S. PATENT DOCUMENTS

| | | | |
|---|---|---|---|
| 4,585,572 A | 4/1986 | Lane et al. | |
| 4,613,444 A | 9/1986 | Lane et al. | |
| 5,636,668 A * | 6/1997 | Thompson | 141/82 |
| 5,785,884 A | 7/1998 | Hammond | |
| 5,861,050 A * | 1/1999 | Pittel et al. | 95/115 |
| 6,294,235 B1 | 9/2001 | Detoumay et al. | |
| 6,612,458 B2 | 9/2003 | Balzer et al. | |
| 6,893,603 B2 | 5/2005 | Rohde et al. | |
| 6,957,542 B1 | 10/2005 | Kido | |
| 7,309,381 B2 | 12/2007 | Yamazaki et al. | |
| 7,320,357 B2 | 1/2008 | Pause | |
| 7,543,574 B2 * | 6/2009 | Yamazaki et al. | 123/519 |
| 2006/0144228 A1 * | 7/2006 | Reiners et al. | 95/144 |
| 2006/0196480 A1 * | 9/2006 | Kosugi et al. | 123/516 |
| 2007/0119306 A1 | 5/2007 | Yamada et al. | |
| 2008/0184973 A1 * | 8/2008 | Yamazaki et al. | 123/519 |

* cited by examiner

Primary Examiner—Thomas N Moulis
(74) *Attorney, Agent, or Firm*—Glenn S. Arendsen

(57) ABSTRACT

A fuel tank has phase change material located within its interior and in a heat transferring relationship with the contents of the tank. Thermal energy is transferred from the contents of the tank to the phase change material (PCM) when tank temperatures increase to the phase transition temperature (PTT) of the PCM. The PCM then transforms from solid to liquid to absorb substantial thermal energy and thereby helps to reduce vapor emissions. PCM also can be applied to the exterior of the tank. The fuel tank is particularly useful in automotive applications and also can be used in boats, motorcycles, and smaller powered equipment.

16 Claims, 4 Drawing Sheets

FUEL TANK HAVING IMPROVED THERMAL STABILITY

BACKGROUND

This invention provides a fuel tank for automotive applications and other power sources that has improved thermal stability and reduced emissions of fuel vapor.

Concerns about our atmosphere continue to increase along with concerns about US dependence on petroleum products. These factors emphasize developing technologies for automotive and other applications to reduce consumption of motor fuels by conventional internal combustion engines, proposed external combustion engines, combinations of batteries and engines (hybrid vehicles, including plug-in hybrids), and fuel cells. Hybrid vehicles are likely to need supplemental power to achieve commercially acceptable range and power, and petroleum products are likely to continue to be a prominent source of energy for automobiles, trucks, motorcycles, and other consumer equipment.

Modern gasolines contain over one hundred different hydrocarbons with iso-octane as one of the more prominent. Each refiner adds other additives in marketing efforts and to improve combustion efficiency. Additionally the federal government and many state governments require reformulated gasoline that contain oxygenates such as ethanol. At lower concentrations ethanol increases the vapor pressure of gasoline-ethanol blends. Accordingly gasoline tanks contain a complex mix of compounds that tend to produce fuel vapor emissions over a range of temperatures and under a variety of operating conditions.

Fuel vapors are emitted from vehicle fuel tanks when the vehicle is being refueled, and the art provides a fuel vapor recovery canister that is connected to the fuel tank and that contains an adsorbent material for capturing vapors formed during refueling. Conceptually when refueling is finished and the vehicle is driven, air is drawn back through the canister and the resulting air-vapor mixture is ingested into the engine where it is combusted.

The air is expected to regenerate the adsorbent material to enable operation during the next refueling, but complications arise from exhaust emissions caused by the unknown amounts of extra fuel vapor that the engine is ingesting. Further, successfully purging the adsorbent material requires sufficient engine vacuum to draw air through the canister, and boosted engines and direct injected engines occasionally are unable to achieve desired air flow. Purge opportunities for plug-in hybrids can be delayed for several days. Purging also is infrequent for non-automotive applications such as boats.

Adsorption of fuel vapor during refueling is exothermic, and to reduce the size of the canister, U.S. Pat. Nos. Pitel et al. 5,861,050 and Yamazaki et al. 7,309,381 teach the addition of phase change materials into the canister to help cool the adsorbent. These structures increase the need for purging air flow.

While vehicle refueling takes place on an irregular cycle over several days, typical diurnal vehicle operations consist of driving to work, parking the vehicle for up to several hours, and driving the vehicle home, or of driving to and parking for a short time at multiple locations. Daytime temperatures typically add thermal energy to fuel tanks during parking and thereby increase the vapor pressure of the fuel to the point where vapor emissions occur. Vapor emissions also can occur from running losses of automobiles when temperature increases during vehicle operation produce more vapor than the amount of liquid fuel that is being withdrawn from the fuel tank by the engine. Accordingly vehicle emissions of fuel vapors can occur with much greater frequency and in much more material amounts than only during refueling.

SUMMARY OF THE INVENTION

This invention provides a fuel tank that has enhanced thermal stability for the fuel it contains and reduced vapor emissions from the fuel. The fuel tank has an inlet for admitting fuel into the tank during refueling, an outlet for removing fuel from the tank as needed, and phase change material installed within the tank and in a heat transfer relationship with the contents of the fuel tank. The phase change material is calibrated to undergo a phase change and absorb thermal energy when the temperature of the contents of the tank rises to a point at which increased vapor pressure of the contents could result in significant vapor emissions.

Phase change materials (PCMs) are chemical formulations that transform from one phase, typically the solid phase, to another phase, typically the liquid phase, upon reaching the phase transition temperature (PTT) of the formulation. During this operation the phase change material absorbs its fusion energy.

Phase change material preferably is installed within a sealed container positioned proximately to the bottom inner surface of the fuel tank where the container is positioned to be in contact with the liquid fuel within the tank regardless of the amount of fuel within the tank. This places the PCM in a heat transfer relationship with the liquid fuel. The container usually is submerged in the liquid fuel, and even when the tank is nearly empty liquid fuel sloshes back and forth over the container to achieve good heat transfer characteristics from the liquid fuel to the PCM. The container preferably is spaced slightly away from the bottom interior surface of the tank.

Alternatively the container of phase change material can be positioned proximately to the upper surface, the ceiling, of the tank interior where the PCM of the container is in a heat transfer relationship with vapors evaporated from the liquid fuel within the tank. In this location the PCM can be effective in helping to cool and condense fuel vapors and thereby reduce the vapor pressure within the tank.

In another useful construction a container of PCM with appropriate buoyancy can be located in the fuel tank where it floats on the liquid fuel. The PCM then is in a heat transfer relationship with both liquid fuel at the surface of the liquid fuel and evaporative vapors formed from the liquid fuel.

Additional effectiveness can be achieved by applying containers of PCM to multiple portions of the interior surfaces of the fuel tank and even to each of the interior surfaces of a fuel tank. These installations offer opportunities for having a fuel tank equipped with PCMs that transform at differing phase transition temperatures. Typically the PCMs at the bottom portion of the tank and in contact with liquid fuel are calibrated with lower phase transition temperatures and those at upper portions of the tank where they are in contact with fuel vapors are calibrated with higher phase transition temperatures.

If desired as noted above this can be reversed with PCM in the upper portions having a phase transition temperature lower than the PCM in the lower portion to provide a different combination of vapor temperature control and liquid temperature control. The construction also can provide a dual function of thermally insulating the fuel from the environment.

In a similar construction containers of PCM can be applied to one or more exterior surfaces of a fuel tank. Heat transfer to the phase change material is partially inhibited by the walls of the tank, but this construction enables applying the containers to fuel tanks already in use.

An alternate construction of a fuel tank that provides enhanced thermal stability for the liquid fuel it contains and reduced vapor emissions from the fuel comprises an inner tank for receiving and dispensing fuel, a larger outer tank surrounding and encasing the inner tank and forming an annular space between the outer tank and the inner tank, and phase change materials within the annular space that are calibrated to change phase and thereby absorb heat when the temperature of the fuel increases to the point at which significant emissions of fuel vapor can occur.

Substantially filling the annular space with PCM enables the use of additional PCM, and the annular space offers opportunities for PCMs with differing phase transition temperatures, with those at the bottom portion of the tank and in contact with liquid fuel having a PTT lower than the phase change material located in upper portions of the tank and in contact mostly with fuel vapors. Again as noted above if desired this can be reversed with PCM in the upper portions having a PTT lower than the PCM in the lower portion.

DETAILED DESCRIPTION

Figure 1:
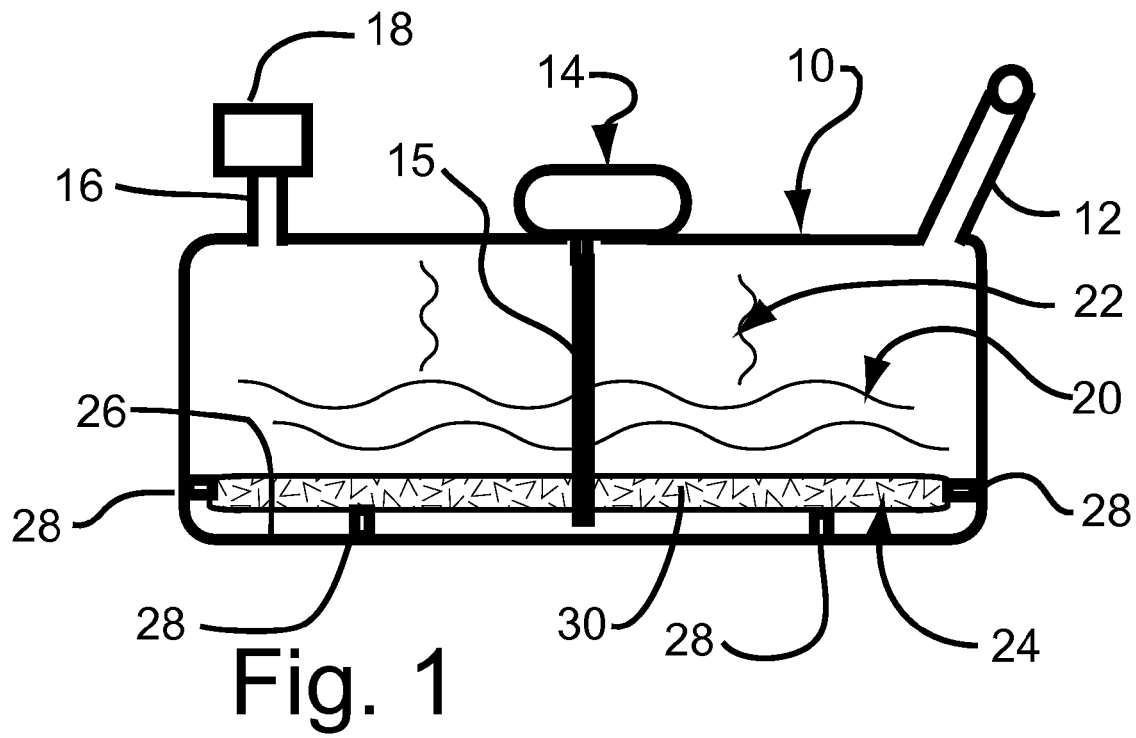
FIG. 1 is a sectional view of an automotive fuel tank that shows a fuel filler nozzle, fuel outlet mechanism, a vapor capturing canister, and a container of phase change material positioned proximately to the interior floor of the tank.
Figure 2:
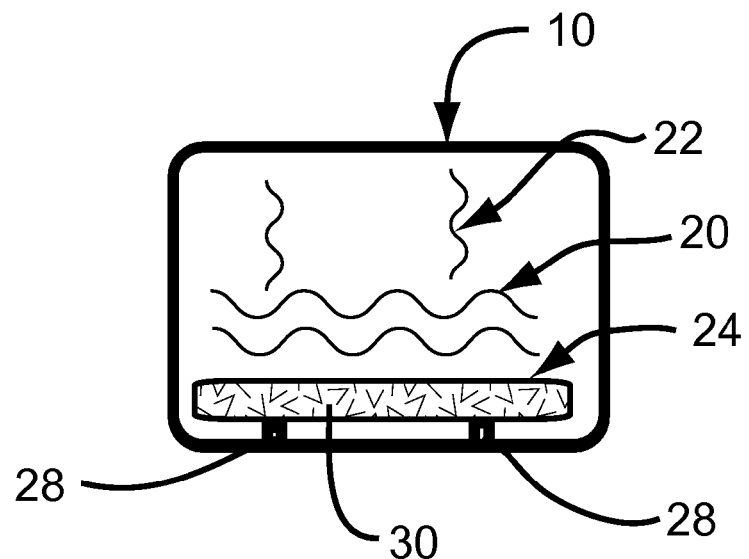
FIG. 2 is a side view of the fuel tank of FIG. 1. The filler nozzle, fuel outlet mechanism, and vapor canister are omitted from FIG. 2 for clarity.
Figure 3:
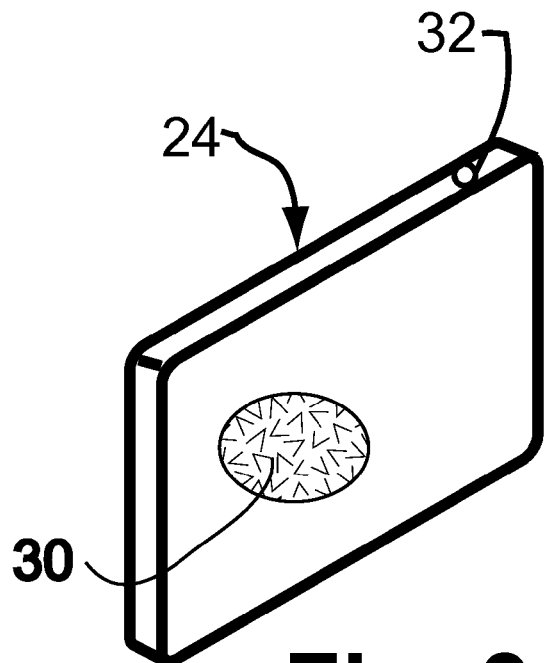
FIG. 3 is a perspective of a container of phase change material suitable for installation within a fuel tank.

FIGS. 1, 2, and 3

FIGS. 1 and 2 show an automotive blow-molded fuel tank 10 has a fuel filler tube 12 extending into its interior, a fuel outlet assembly 14 with a fuel pickup tube 15 for supplying fuel from the tank to the vehicle power plant, and a vapor escape tube 16 that connects the tank interior to a vapor capturing canister 18. Fuel tank 10 contains liquid fuel 20 and fuel vapor 22. Vapor escape tube 16 and canister 18 are optional to this invention but typically are installed in modern vehicles.

Referring also to FIG. 3, a relatively flat sealed container 24 is fabricated of steel, stainless steel, polymeric materials, or other materials resistant to refined petroleum products and fuel additives. Container 24 is filled with phase change material 30 (shown through a cut-away window) via opening 32 and opening 32 is sealed after filling. Container 24 is sized to fit proximately to the lower interior surface of tank 10 and is positioned and held in place by supports 28 shown in FIGS. 1 and 2.

Container 24 is positioned to be in contact with liquid fuel 20 within the tank regardless of the amount of fuel within the tank. Container 24 usually is submerged in the liquid fuel, and even when the tank is nearly empty liquid fuel 24 sloshes back and forth over the container to achieve good heat transfer characteristics from the liquid fuel to container 24 and PCM 30.

The container preferably is spaced slightly away from the bottom interior surface of the tank. The container can be located at the bottom surface of the tank, but this tends to transfer heat directly from the environment to the PCM, and container 24 preferably is positioned slightly above and spaced away from the bottom interior surface.

PCM 30 comprises a composition that reversibly changes from solid to liquid when exposed to thermal energy, known to chemists as the heat of fusion, and absorbs substantial amounts of thermal energy in the process. Subsequent cooling that occurs during a typical diurnal cycle and also during refueling converts the liquid back to its solid state and thereby prepares the composition for additional cycles.

A variety of suitable phase change materials are taught by the art. Hydrated inorganic salts suitable for use are disclosed in U.S. Pat. Nos. Hammond 5,785,884, Lane et al. 4,585,572, and Lane et al. 4,613,444, and in the literature along with many paraffins, polyethylene glycols, and additional organic compounds. Initial calculations suggest that a few kilograms of lithium nitrate trihydrate would likely handle considerable thermal energy in a typical automotive fuel tank and thereby help materially in controlling vapor emissions from the fuel.

Chemically modified inorganic and organic compounds can be adjusted to have considerably different phase transition temperatures (PTT). Compositions with a PTT within a temperature range up to one hundred ten degrees Fahrenheit (thirty eight degrees Celsius) are useful in gasoline tanks for automotive applications. EPA test procedures specify hot soaking of vehicles at ninety five degrees Fahrenheit (thirty five degrees Celsius) plus or minus five Fahrenheit degrees, and selecting PCMs with PTTs within this range would be advantageous in automotive applications.

Phase change material 30 of container 24 is calibrated to undergo a phase change and absorb thermal energy when the temperature of liquid fuel 20 rises to a point at which increased vapor pressure of the contents could result in significant vapor emissions. PCM 30 typically has a PTT of approximately ninety to ninety five degrees Fahrenheit or slightly below this range and PCM 30 begins to absorb thermal energy from liquid fuel 20 when the temperature of liquid fuel 20 reaches its PTT, thereby helping to maintain the temperature of liquid fuel 20 from rising above this range where excessive vapor emissions could be formed within tank 10 and escape from tank 10.

FIG. 4

Figure 4:
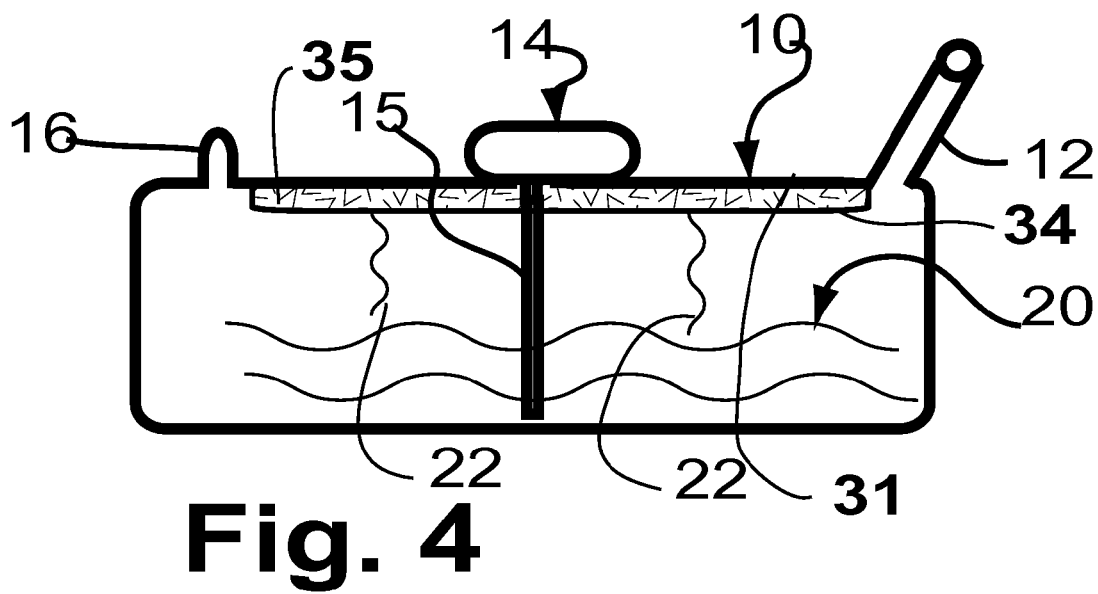
FIG. 4 is a sectional view of a fuel tank with a container of phase change material positioned at its upper interior surface.

Similarly to FIGS. 1 and 2, FIG. 4 shows an automotive blow-molded fuel tank 10 that has a fuel filler tube 12 extending into its interior, a fuel outlet assembly 14 with a fuel pickup tube 15 for supplying fuel from the tank to the vehicle power plant, and a vapor escape tube 16 that connects the tank interior to a vapor capturing canister (not shown). Fuel tank 10 contains liquid fuel 20 and fuel vapor 22.

A container 34 of PCM 35 is constructed similarly to the container of FIG. 3 and is positioned at the upper interior surface 31 of tank 10. Container 34 can be in contact with liquid fuel when the tank is completely filled but as fuel is withdrawn container 34 remains in contact with fuel vapor 22. Phase change material 35 of container 34 is calibrated to undergo a phase change and absorb thermal energy when the temperature of vapor 22 increases as a result of thermal energy received directly from the environment by vapor 22. As the temperature of vapor 22 approaches the point at which significant vapor emissions could escape from tank 10 PCM 35 reaches its calibrated PTT and draws heat from fuel vapors 22, thereby cooling and condensing the fuel vapor and reducing overall vapor pressure within tank 10.

FIG. 5

Figure 5:
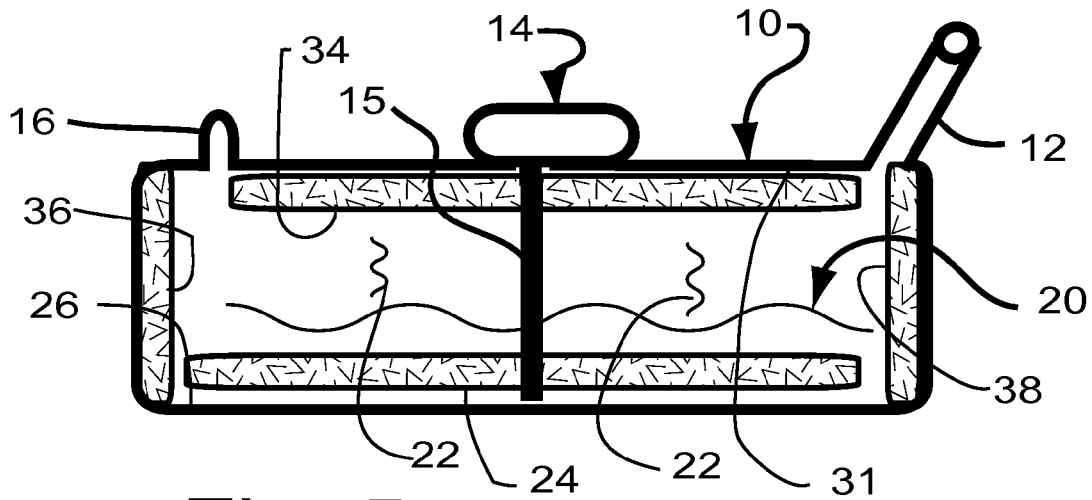
FIG. 5 is a sectional view of a fuel tank in which containers of phase change materials are installed on multiple interior surfaces.

FIG. 5 shows a fuel tank 10 that has a fuel filler tube 12 extending into its interior, a fuel outlet assembly 14 with a fuel pickup tube 15 for supplying fuel from the tank to the vehicle power plant, and a vapor escape tube 16 that connects the tank interior to a vapor capturing canister (not shown). Fuel tank 10 contains liquid fuel 20 and fuel vapor 22.

A container 24 of PCM is installed proximately to the floor of tank 10 as described above in regard to FIGS. 1 and 2, another container 34 of PCM is installed at the ceiling of tank 10 as described above in regard to FIG. 4, and additional containers 36 and 38, each filled with PCM, are installed on the side walls of fuel tank The PCM of each of containers 24, 34, 36, and 38 can have the same PTT to provide additional heat absorbing capacity, but the advantage of the construction of FIG. 5 is realized more fully when the containers contain PCMs with differing PTTs. For example the PCM in container 34 at the upper surface usually is in contact with fuel vapor and can have a PTT that is higher than the PCM within container 24 at the lower surface to enable container 34 to condense vapors that receive thermal energy directly from the environment. The PCM in container 24 is in contact with liquid fuel 20 as described above in regard to FIGS. 1 and 2 and has a PTT that helps to control the temperature of liquid fuel 20. The phase change materials in side containers 36 and 38 can be calibrated with PTTs like that of container 24 or 34 or somewhere in between as desired to achieve effective results. This construction provides extra flexibility in dealing with modern gasolines.

FIG. 6

Figure 6:
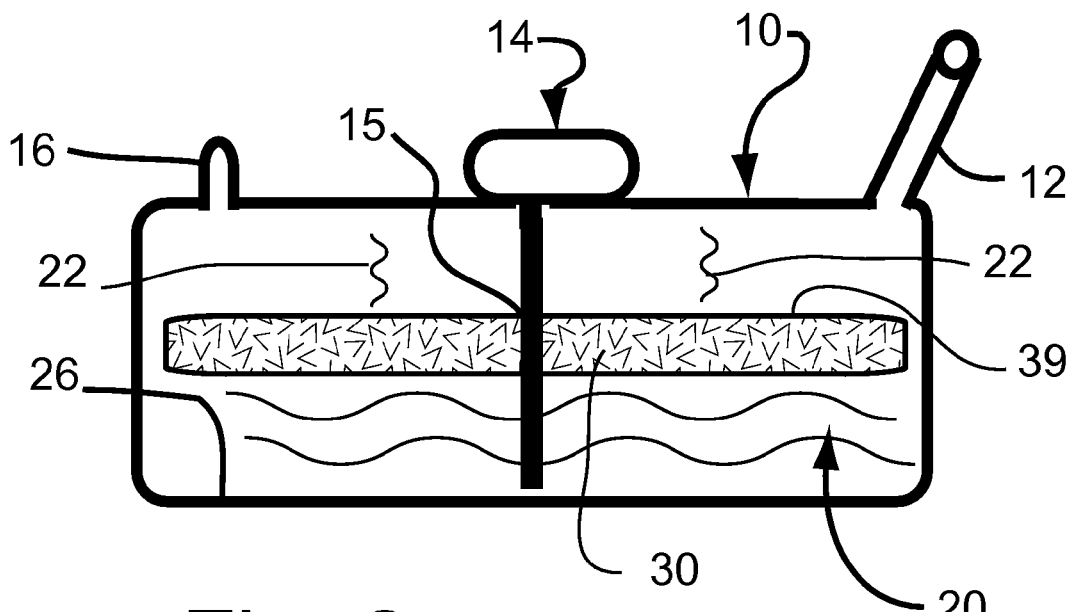
FIG. 6 is a sectional view of a fuel tank in which a container of phase change material is floating on the surface of the liquid fuel.

FIG. 6 shows a fuel tank 10 that has a fuel filler tube 12 extending into its interior, a fuel outlet assembly 14 with a fuel pickup tube 15 for supplying fuel from the tank to the vehicle power plant, and a vapor escape tube 16 that connects the tank interior to a vapor capturing canister (not shown). Fuel tank 10 contains liquid fuel 20 and fuel vapor 22.

A container 39 of PCM is designed with sufficient buoyancy to float on fuel liquid 20 and is in heat transfer relationship with both liquid fuel 20 and fuel vapor 22. The PCM within container 39 is calibrated with a phase transition temperature that is selected appropriately to absorb thermal energy from the surface of liquid fuel 20 and vapor forming on the surface and just above the surface.

FIG. 7

Figure 7:
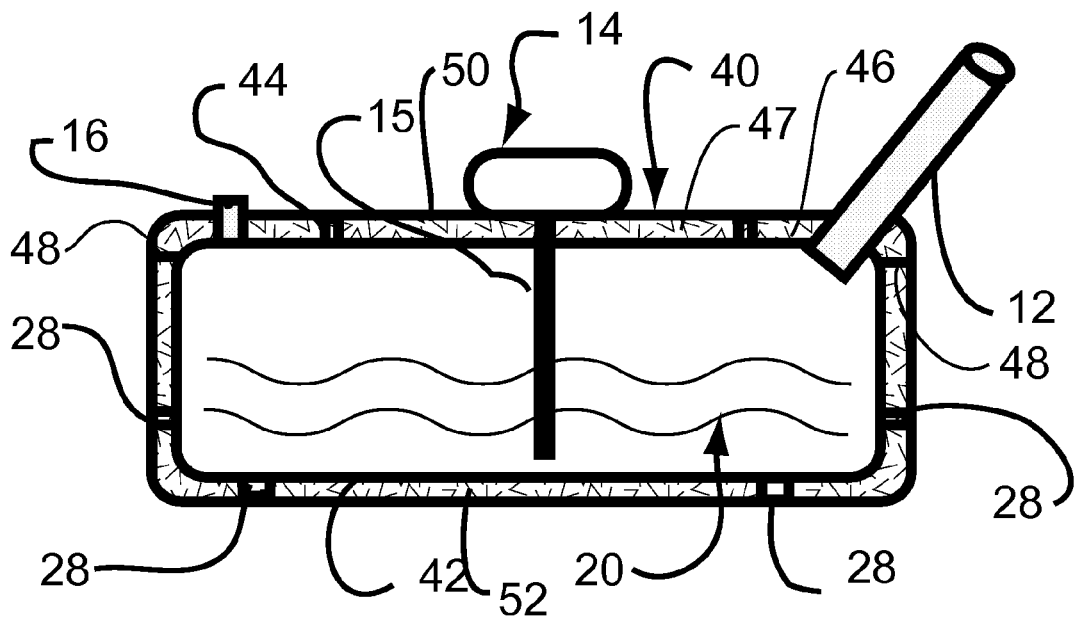
FIG. 7 is a sectional view of a double wall fuel tank in which a larger tank serves as a shell to surround an inner tank and form an annular space for phase change material between the shell and the tank.

Turning to FIG. 7, a fuel tank assembly is made up of an outer tank 40 that surrounds an inner tank 42. Inner tank 42 is spaced within and separated from outer tank 40 by supports 28 and spacers 44 to form an annular space 46. A fuel filler tube 12 and a vapor vent tube 16 extend through outer tank 40 and into inner tank 42. Vapor vent tube is connected to a vapor canister (not shown). Similarly a fuel outlet assembly has a fuel pickup tube 15 extending through tank 40 and into tank 42.

Tank 42 contains liquid fuel 20 and fuel vapor 22. Annular space 46 extends completely around tank 42 and is filled with PCM 47 via a conventional opening, not shown, that is sealed after filling. As liquid fuel 20 receives thermal energy from the vehicle environment, the thermal energy is transferred readily to PCM 47, beginning with the PCM material adjacent to the liquid fuel within tank 42 and eventually extending upward along the walls of the tank to the PCM located in the annular space at the upper portion of tank 42.

Phase change materials with differing phase transition temperatures provide extra thermal control in the construction of FIG. 7. In this regard annular space 46 optionally can be divided into multiple sections 50 and 52 by partitions 48 and the PCM in the upper section 50 can be selected with a PTT that differs from the PTT of the PCM in the lower section 52. Multiple partitions can be used to divide the annular space into several sections and the PCM in each section can be selected with a different PTT.

FIG. 8

Figure 8:
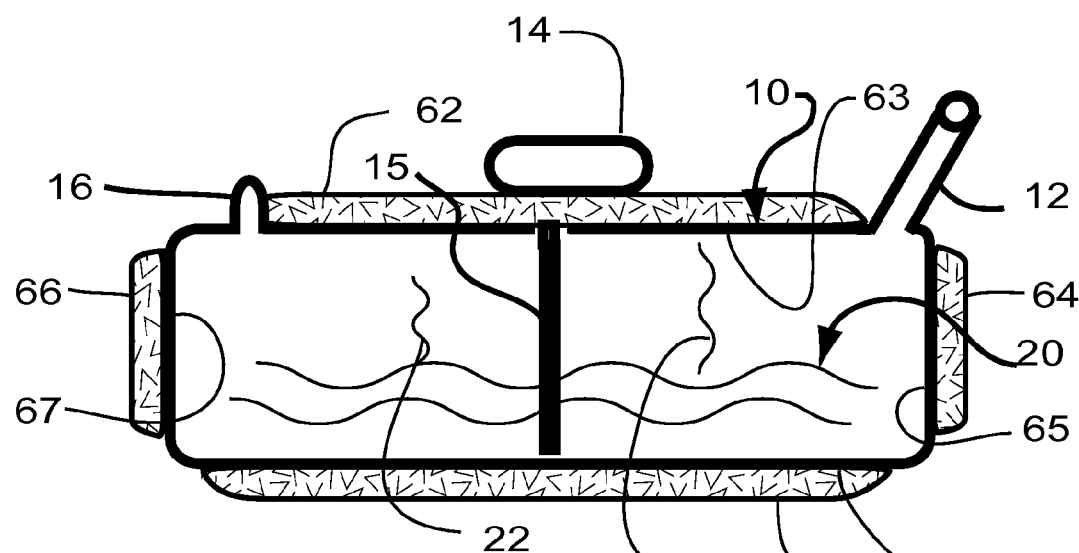
FIG. 8 is a sectional view of a fuel tank that has phase change materials positioned on its exterior surfaces.

FIG. 8 shows a fuel tank 10 that has a fuel filler tube 12 extending into its interior, a fuel outlet assembly 14 with a fuel pickup tube 15 for supplying fuel from the tank to the vehicle power plant, and a vapor escape tube 16 that connects the tank interior to a vapor capturing canister (not shown). Fuel tank 10 contains liquid fuel 20 and fuel vapor 22.

Fuel tank 10 has a container 60 of PCM attached to the exterior of its bottom surface 61, another container 62 of PCM attached to the exterior of its upper surface 63, and containers 64 and 66 of PCM attached to the exteriors of its side surfaces 65 and 67. Containers 60, 62, 64, and 66 are shaped to conform to the exterior surfaces of tank 10 to provide good heat transfer characteristics with liquid fuel 20 and fuel vapor 22 within the tank. The containers can be added to the outside of the tank after the tank is manufactured and even after it is installed in a vehicle.

Each of containers 60, 62, 64, and 66 can contain a PCM having a phase transition temperature that differs from the phase transition temperature of the PCM of another of the containers and indeed from each of the other containers of the installation.

Containers of PCMs can have internal fins or other surface features that improve heat transfer characteristics with the phase change materials. Containers of PCMs for use inside a fuel tank also can have external fins or other surface features for increased heat transfer with liquid fuel or fuel vapor. Similarly the inner fuel tank of the double wall construction can have surface features on both its inner walls and outer walls to improve heat transfer. With sufficient PCM it is possible to eliminate the need for vapor canisters in some automotive applications with hybrid power plants that need only infrequent refueling.

The fuel tank of this invention is particularly suited to automotive applications but also can be used in boats, motorcycles, and smaller equipment powered by petroleum products. Fuel tanks were manufactured for many years by stamping steel into an upper portion and a lower portion, once referred to as clam shells in the trade, and welding or otherwise bonding the two halves together. Most modern automotive fuel tanks are manufactured from polymeric materials that are tough and resilient and can be molded or otherwise formed to fit particular vehicle locations.

Many molding techniques are available and teachings are presented in U.S. Pat. No. Detoumay et al. 6,294,235, which shows a blow molded fuel tank made of high density polyethylene. U.S. Pat. No. Balzer et al. 6,612,458 discloses a double wall fuel tank made of polymeric materials that is assembled similarly to tanks made of stamped steel from upper and lower portions. Locating one or more containers of PCM within a stamped steel or molded polymeric fuel tank can be carried out by established manufacturing arts.

The invention claimed is:

1. A fuel tank that provides enhanced thermal stability for the liquid fuel it contains and reduced vapor emissions from such liquid fuel comprising an inlet for admitting fuel into the tank during refueling, an outlet for removing fuel from the tank as needed, and phase change material installed within the tank and in a heat transfer relationship with the contents of the tank, said phase change material being calibrated to undergo a phase change and absorb thermal energy when the temperature within the tank rises to increase the vapor pressure of its contents.

2. The fuel tank of claim 1 comprising a container installed within the tank proximately to the bottom interior surface of the tank where the container is in contact with the liquid fuel within the tank regardless of the amount of fuel within the tank, said container containing the phase change material so that the phase change material is in a heat transfer relationship with the liquid fuel.

3. The fuel tank of claim 2 in which the container is located above and is spaced away from the bottom interior surface.

4. The fuel tank of claim 3 comprising multiple containers of phase change materials installed on its interior surfaces.

5. The fuel tank of claim 4 in which one container contains a phase change material that is calibrated to change its phase at a phase transition temperature that differs from the phase change material in another container.

6. The fuel tank of claim 1 comprising a container installed within the tank and located proximately to the upper surface of the fuel tank, said container containing the phase change material so that the phase change material is in a heat transfer relationship with vapors evaporated from the liquid fuel within the tank.

7. The fuel tank of claim 1 comprising multiple containers of phase change materials installed on its interior surfaces.

8. The fuel tank of claim 1 comprising multiple containers of phase change materials installed on its interior surfaces, at least one of said containers containing a phase change material that is calibrated to change its phase at a phase transition temperature that differs from the phase change material in another container.

9. The fuel tank of claim 1 comprising a container installed within the tank and in which the phase change material is installed within the container, said container having sufficient buoyancy to float on the top surface of the liquid fuel within the tank, said container being in contact with both liquid fuel within the tank and vapors evaporated from the liquid fuel.

10. A fuel tank that provides enhanced thermal stability for the liquid fuel it contains and reduces vapor emissions from said fuel comprising an inner tank for receiving and dispensing fuel, a larger outer tank surrounding and encasing the inner tank and forming an annular space within the outer tank and surrounding the inner tank, and phase change materials within the annular space, said 11. The fuel tank of claim 10 in which the annular space is substantially filled with phase change materials.

12. The fuel tank of claim 11 in which the annular space is separated into multiple sections and each section contains a phase change material that undergoes a phase change at a phase transition temperature that differs from the phase transition temperature of the phase change material in another section.

13. The fuel tank of claim 10 in which the annular space is separated into multiple sections and each section contains a phase change material that undergoes a phase change at a phase transition temperature that differs from the phase transition temperature of the phase change material in another section.

14. A fuel tank that provides enhanced thermal stability for the liquid fuel it contains and reduced vapor emissions from said fuel tank comprising an inlet for admitting fuel into the tank during refueling, an outlet for removing fuel from the tank as needed, and phase change material attached to an outer surface of the fuel tank, said phase change material being calibrated to undergo a phase change and absorb heat when the temperature within the tank rises to increase vapor pressure.

15. The fuel tank of claim 14 in which phase change material is applied to multiple outer surfaces of the fuel tank.

16. The fuel tank of claim 15 in which the phase change material on one of the outer surfaces has a phase change temperature that differs from the phase change material on another of the outer surfaces.

* * * * *